(12) United States Patent
DeWald

(10) Patent No.: US 7,296,642 B1
(45) Date of Patent: Nov. 20, 2007

(54) SUSPENDED AXLE MODULES FOR SKID STEER LOADERS

(75) Inventor: Gregory DeWald, Mooresville, NC (US)

(73) Assignee: Dana Corporation, Toledo, OH (US)

( * ) Notice: Subject to any disclaimer, the term of this patent is extended or adjusted under 35 U.S.C. 154(b) by 198 days.

(21) Appl. No.: 11/060,944

(22) Filed: Feb. 18, 2005

Related U.S. Application Data

(60) Provisional application No. 60/545,366, filed on Feb. 18, 2004.

(51) Int. Cl.
*B62D 11/00* (2006.01)
*B60G 9/00* (2006.01)

(52) U.S. Cl. ............................. 180/6.38; 280/124.116

(58) Field of Classification Search ............... 180/304, 180/305, 6.38, 6.3; 280/104, 676, 677, 678, 280/124.116, 124.128, 124.153; 74/665 R, 74/718, 665 D
See application file for complete search history.

(56) References Cited

U.S. PATENT DOCUMENTS

| | | | | |
|---|---|---|---|---|
| 2,349,151 | A * | 5/1944 | Farnsworth | 180/6.38 |
| 2,554,785 | A * | 5/1951 | Leliter | 180/24.05 |
| 2,850,920 | A * | 9/1958 | Petsch | 74/665 R |
| 3,306,390 | A * | 2/1967 | Jamme | 180/209 |
| 3,923,112 | A * | 12/1975 | Goodgame | 180/24.11 |
| 4,124,084 | A | 11/1978 | Albright et al. | |
| 4,202,564 | A * | 5/1980 | Strader | 280/678 |
| 5,470,190 | A | 11/1995 | Bamford et al. | |
| 6,182,780 | B1 | 2/2001 | Brookins | |
| 6,584,710 | B1 | 7/2003 | Lin et al. | |
| 6,633,804 | B2 | 10/2003 | Dix et al. | |
| 6,634,445 | B2 | 10/2003 | Dix et al. | |
| 6,648,352 | B2 | 11/2003 | Felsing et al. | |
| 6,650,985 | B2 | 11/2003 | Lin et al. | |
| 6,663,114 | B2 | 12/2003 | Lamela et al. | |
| 6,718,244 | B2 | 4/2004 | Lin et al. | |
| 6,823,961 | B2 * | 11/2004 | Lamela et al. | 180/305 |
| 6,916,037 | B2 * | 7/2005 | Baxter et al. | 280/683 |
| 7,044,258 | B2 * | 5/2006 | Lamela et al. | 180/305 |
| 7,077,411 | B2 * | 7/2006 | Peters et al. | 280/124.132 |
| 2003/0188910 | A1 | 10/2003 | Bateman et al. | |
| 2003/0205424 | A1 | 11/2003 | Felsing et al. | |
| 2003/0205426 | A1 | 11/2003 | Lamela et al. | |
| 2003/0209379 | A1 | 11/2003 | Bateman et al. | |
| 2004/0032107 | A1 * | 2/2004 | Timoney et al. | 280/124.128 |

\* cited by examiner

*Primary Examiner*—Tony H. Winner
(74) *Attorney, Agent, or Firm*—Dykema Gossett PLLC

(57) ABSTRACT

A suspension and a drive assembly is provided for forward and rear wheels disposed on first and second longitudinally spaced axles of a skid steer loader. The suspension includes a central bearing support and leading and trailing arms that are independently, pivotally mounted to the central bearing support and which support the forward and rear wheels. The drive assembly includes gear housings coupled to the leading and trailing arms and a motor having a housing coupled to one of the gear housings. The motor's output shaft drives a gear arrangement in one of the gear housings that in turn drives a driven axle shaft supporting one of the forward and rear wheels. A driven shaft is coupled to the output shaft through a universal joint and drives another gear arrangement in the other gear housing that in turn drives another driven axle shaft supporting the other wheel.

21 Claims, 4 Drawing Sheets

SUSPENDED AXLE MODULES FOR SKID STEER LOADERS

This application claims priority to pending U.S. Provisional Patent Application Ser. No. 60/545,366 filed on Feb. 18, 2004, the entire disclosure of which is incorporated herein by reference.

BACKGROUND OF THE INVENTION

1. Field of the Invention

This invention relates to a vehicle suspension and, in particular, to a suspension and a drive assembly for use in skid steer loaders.

2. Discussion of Related Art

Skid steer loaders are loaders that are designed to enable maneuverability within confined spaces. A conventional skid steer loader includes a forward axle and a rear axle with a corresponding set of forward and rear wheels disposed on either side of the vehicle. The forward and rear wheels on any one side of the vehicle are moved together, but are moved independently from the forward and rear wheels on the opposite side of the vehicle. As a result, the speed of the wheels on each side of the vehicle can be independently controlled to allow forward or reverse motion of the loader and to allow the loader to turn within confined spaces.

The wheels in a conventional skid steer loader are driven by a motor disposed between the longitudinal frame rails of the vehicle frame. Sprocket chains connect one or more output shafts of the motor with the axle shafts on which the wheels are supported. The axle shafts are disposed within housings that are rigidly attached to the vehicle frame.

The conventional skid steer loader described above suffers from several drawbacks. In particular, the rigid linking of the axle shafts to the vehicle frame and the lack of independent suspension between the forward and rear wheels restricts motion and vibration damping.

The inventors herein have recognized a need for a suspension and drive assembly that will minimize and/or eliminate one or more of the above-identified deficiencies.

SUMMARY OF THE INVENTION

The present invention provides both a suspension and a drive assembly for use on with first and second wheels that are disposed on first and second longitudinally spaced axles in a vehicle.

A suspension in accordance with the present invention includes a bearing support disposed about an axis. The suspension further includes a first arm mounted to the bearing support for rotation about the axis. The first arm extends forward from the bearing support and is configured to support a first wheel proximate a forward end of the first arm. The suspension further includes a second arm mounted to the bearing support for rotation about the axis independent of the first arm. The second arm extending rearward from the bearing support and is configured to support a second wheel proximate a rearward end of the second arm.

A drive assembly in accordance with the present invention includes a motor having an output shaft, a first pinion gear mounted on the output shaft and a first ring gear in mesh with the first pinion gear and drivingly coupled to the first wheel. The drive assembly further includes a universal joint coupled to the output shaft. The drive assembly further includes a driven shaft coupled to the universal joint, a second pinion gear mounted on the driven shaft and a second ring gear in mesh with the second pinion gear and drivingly coupled to the second wheel.

The suspension and the drive assembly of the present invention offer significant advantages. In particular, the present invention allows for flexible and independent movement of forward and rear wheels that are driven by the same power source but supported on longitudinally spaced axles as in skid steer loaders These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
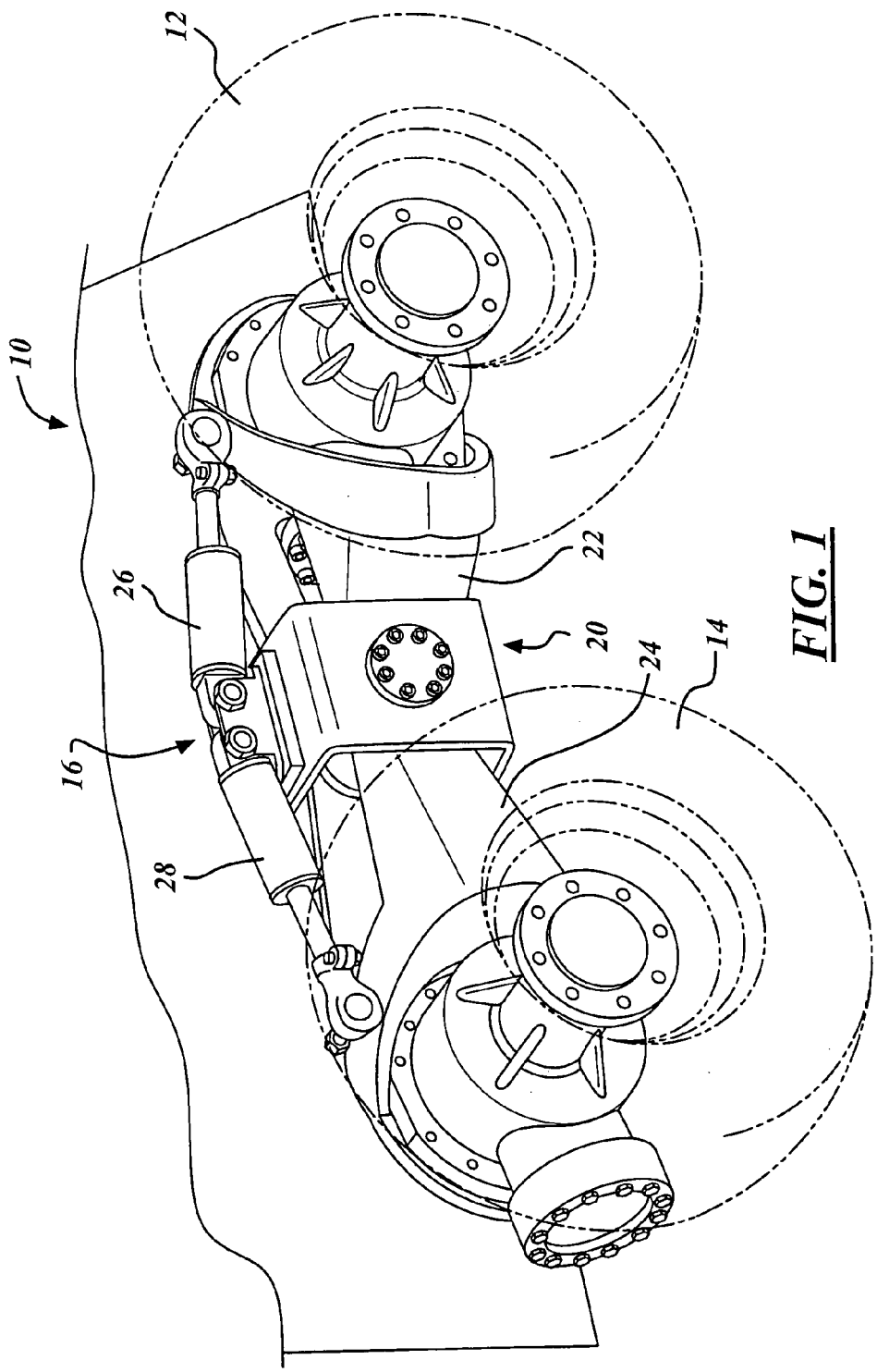
FIG. 1 is a perspective view of a suspension and a drive assembly in accordance with one embodiment of the present invention.

Referring now to the drawings wherein like reference numerals are used to identify identical components in the various views, FIGS. 1-4 illustrates a suspension and drive assembly 10 in accordance with the present invention. Assembly 10 is provided to allow independent movement of forward and rear wheels 12, 14 that are driven together by the same power source and are disposed on longitudinally spaced axles of a vehicle. As a result, assembly 10 is particularly applicable for use with skid steer loaders. It should be understood, however, that assembly 10 may find use in other applications having similar power transmission constructs. An assembly 10 in accordance with the present invention may include both a suspension 16 and a drive assembly 18. Although only one suspension and drive assembly is shown in the illustrations, it should be understood that a similar suspension and drive assembly may be replicated on the other side of a vehicle.

Suspension 16 is provided to dampen movement between the wheels and the vehicle frame. Suspension 16 may include a bearing support 20, suspension arms 22, 24 and dampers 26, 28.

Figure 3:
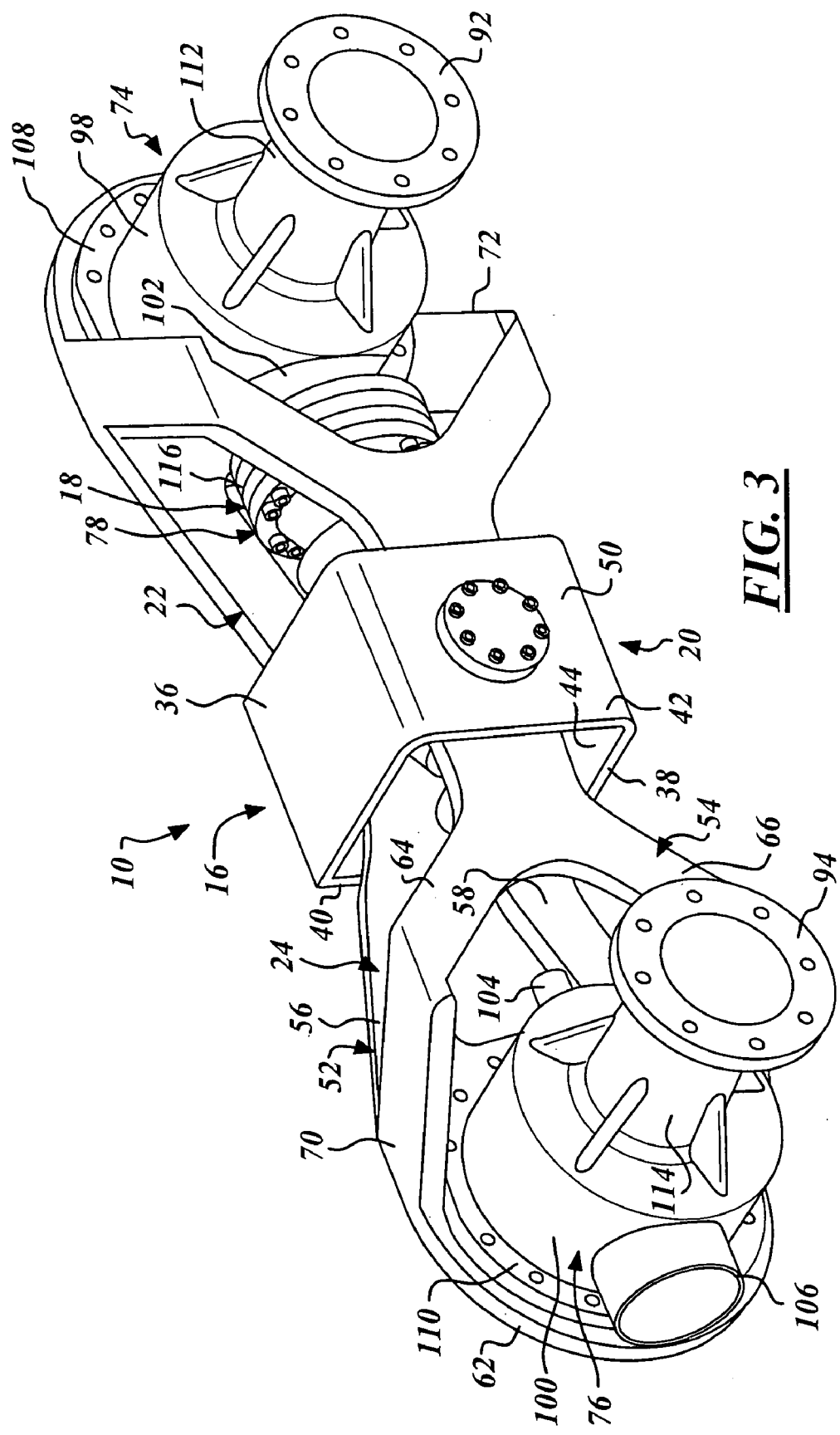
FIG. 3 is a perspective view of portions of the suspension and the drive assembly of FIG. 1.
Figure 4:
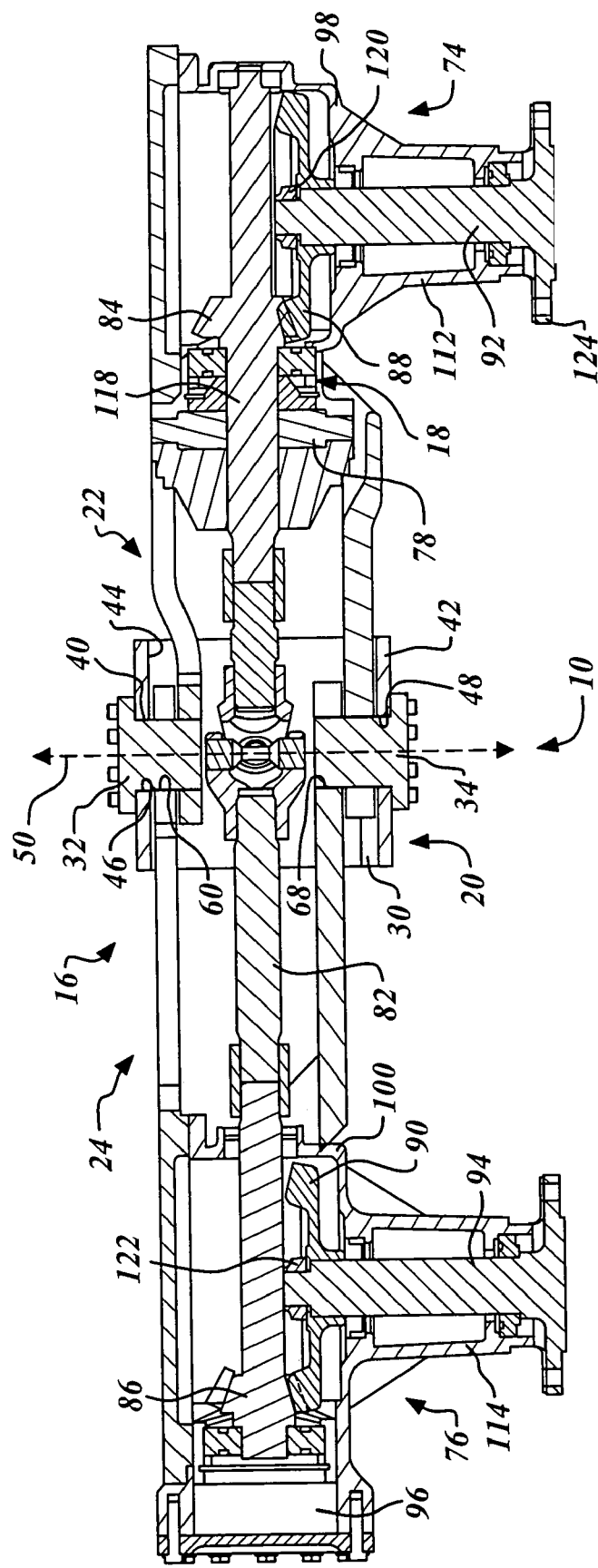
FIG. 4 is a cross-sectional view of the suspension and the drive assembly of FIG. 1.

Bearing support 20 is provided to couple arms 22, 24, to the vehicle frame and allow for independent relative motion of arms 22, 24. Referring now to FIGS. 3-4, bearing support 20 may include a mounting bracket 30 and bearing members 32, 34.

Mounting bracket 30 is provided to support bearing members 32, 34. Bracket 30 may be rigidly coupled to the frame of the vehicle using conventional fasteners. Referring to FIG. 3, bracket 30 may be substantially square or rectilinear with a top wall 36, bottom wall 38 and inboard and outboard side walls 40, 42. Bracket 30 may have rounded edges where any two of walls 36, 38, 40, 42 meet. Bracket 30 defines a central aperture 44 extending in the longitudinal direction of the vehicle. Referring to FIG. 4, bracket 30 also defines aligned openings 46, 48 in side walls 40, 42, respectively in which bearing members 32, 34 are disposed.

Figure 2:
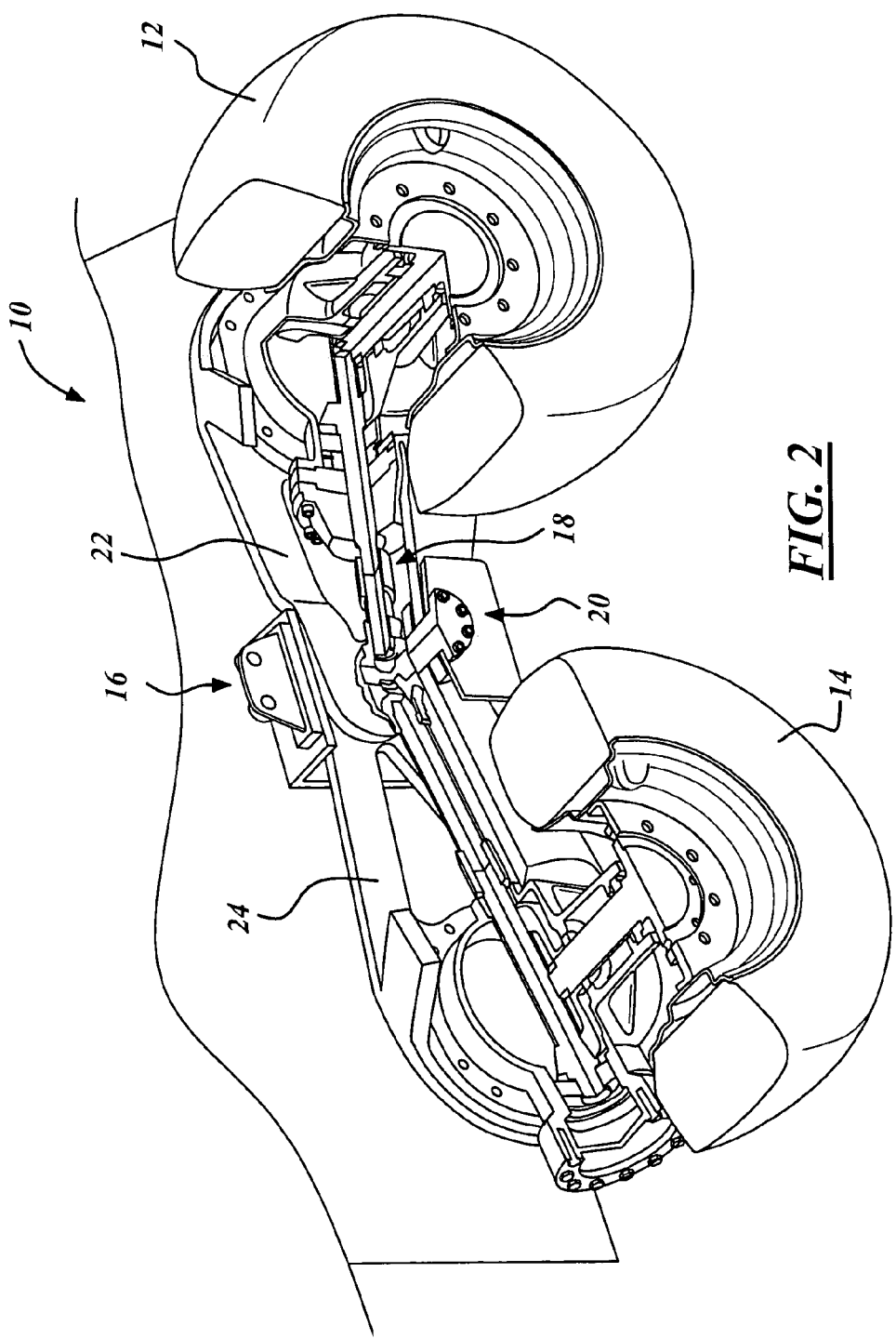
FIG. 2 is a perspective and partial cross-sectional view of the suspension and the drive assembly of FIG. 1.

Referring to FIGS. 1-2, bracket 30 may also include an extension bracket 49 for mounting one end of dampers 26, 28.

Bearing members 32, 34 provide a means for rotatably supporting arms 22, 24. Members 32, 34 may comprise conventional bushings or rotation devices. Members 32, 34 extend inward through openings 46, 48 of bracket 30 into aperture 44. Members 32, 34 are supported in bracket 30 and are aligned and disposed along the same axis 50 and spaced from one another along axis 50.

Suspension arms 22, 24 couple wheels 14, 16 to the vehicle frame. Arm 22 is mounted to bearing support 20 for rotation about axis 50. Arm 22 extends forward from support 20 and is configured to support wheel 12 proximate a forward end of arm 22. Arm 24 is also mounted to bearing support 20 for rotation about axis 50 independent of arm 22. Arm 24 extends rearward from support 20 and is configured to support wheel 14 proximate a rearward end of arm 24. The independent coupling of arms 22, 24 to bearing support 20 for rotation about axis 50 is advantageous. In particular, the use of a single bearing structure reduces cost and weight and preserves space.

Arms 22, 24 may be substantially the same and even identical in construction and each arm 22, 24 may be formed as a unitary piece. Each arm 22, 24 may be said to have inboard and outboard portions 52, 54. Inboard portion 52 includes two diverging members 56, 58 that extend in the longitudinal direction of the vehicle. Members 56, 58 are joined at one end that is disposed within aperture 44 of bracket 30 and that defines an aperture 60 configured to receive bearing member 32. Portion 52 further includes a substantially circular mounting plate 62 integral with members 56, 58 for a purpose described hereinbelow. Outboard portion 54 also includes two diverging members 64, 66 extending generally in the longitudinal direction of the vehicle. Members 64, 66 are joined at one end that is disposed within aperture 44 of bracket 30 and that defines an aperture 68 configured to receive bearing member 34. Aperture 68 is aligned with aperture 60. Members 64, 66 come together (or begin to diverge) at a location that is external to bracket 30 whereas members 56, 58 of the inboard portion come together (or begin to diverge) at a location that is internal to bracket 30. Outboard portion 54 further includes members 70, 72 that join members 64, 66, respectively, with plate 62 of inboard portion 54. It should be understood that the, while the illustrated construction of arms 22, 24 may provide certain advantages in weight, strength, and/or cost, arms 22, 24 may be formed in a variety of ways without departing from the spirit of the present invention.

Dampers 26, 28 are provided to further dampen motion during jounce and rebound of arms 22, 24. Dampers 26, 28 may comprise conventional shock absorbers, springs or struts. Each damper 26, 28 may have one end connected to a corresponding arm 22, 24 and another end coupled to bearing support 20 through extension bracket 49 of mounting bracket 30. As illustrated, dampers 26, 28 extend substantially in the longitudinal direction of the vehicle further conserving space. It should be understood, however, that dampers 26, 28 could be arranged in other ways. For example, dampers 26, 28 could extend vertically with each of dampers 26, 28 having a first end connected to a corresponding gear housing 74, 76 (described hereinbelow) of drive assembly 18 and a second end affixed to the vehicle frame.

Drive assembly 18 is provided to generate and transmit torque to wheels 12, 14. Assembly 18 may include gear housings 74, 76, a motor 78, a universal joint 80, a driven shaft 82, pinion gears 84, 86, ring gears 88, 90, and driven axle shafts 92, 94. Assembly 18 may also include a brake 96.

Gear housings 74, 76 are configured to house pinion gears 84, 86, ring gears 88, 90 and driven axle shafts 92, 94, respectively. Referring to FIG. 3, housings 74, 76 may be substantially similar in construction (although not identical as discussed hereinbelow). Each housing 74, 76 includes a portion 98, 100, respectively, configured to receive corresponding pinion gears 84, 86 and ring gears 88, 90. Portion 98 of housing 74 includes a rearward extension 102 configured to receive a portion of motor 78 and to which motor 78 may be coupled. Portion 100 of housing 76 includes a forward extension 104 configured to receive driven shaft and a rearward extension 106 configured to house brake 96. Each housing 74, 76, further defines a mounting flange 108, 110, respectively, that may extend radially outward from a respective portion 98, 100 and which may be configured to receive conventional fasteners extending therethrough and into a corresponding mounting plate 62 of an arm 22, 24. Each housing may further include a portion 112, 114, respectively, extending outboard from portions 98, 100 and configured to receive a respective driven axle shaft 92, 94. Triangular baffles may joint portions 112, 114 with portions 98, 100 for additional support.

Motor 78 is provided to generate torque for driving wheels 14, 16. Motor 78 may comprise a hydrostatic motor. Referring to FIG. 3, motor 78 includes a housing 116 that may be coupled directly to one of housings 74, 76 (housing 74 in the illustrated embodiment). Motor 78 includes a output shaft 118 that may extend from either longitudinal end of housing 116. In the illustrated embodiment, shaft 118 extends through portion 98 of gear housing 74 and is supported at its forward end by conventional bearings disposed within a recess formed in portion 98 of gear housing 74.

Universal joint 80 is provided to couple driven shaft 82 to output shaft 118 of motor 78 in a conventional manner. Joint 80 may comprise a cardan shaft and shafts 118, 82 may be coupled to joint 80 using conventional yokes. In the illustrated embodiment, universal joint 80 is disposed within bracket 30 of bearing support 20 and may be centered along axis 50.

Driven shaft 82 is provided to transmit torque from motor 78. Driven shaft 82 is coupled to universal joint 80 at a forward end and may be supported by bearings within recesses in portion 100 of gear housing 76.

Pinion gears 84, 86 are configured to transmit torque from shafts 118, 82 to ring gears 88, 90, respectively. Pinion gears are conventional in the art and may be mounted onto shafts 118, 82 or made integral with shafts 118, 82.

Ring gears 88, 90 are configured to transmit torque from pinion gears 84, 86 to driven axle shafts 92, 94. Ring gears 88, 90 are also conventional in the art. Ring gears 88, 90 and are in mesh with pinion gears 84, 86 and are drivingly coupled to wheels 14, 16 through driven axle shafts 92, 94. Ring gears 88, 90 may be affixed to driven axle shafts 92, 94 in a variety of conventional ways including a spline connection. In the illustrated embodiment, ring gears 88, 90 are retained on shafts 92, 94 by nuts 120, 122 which may be threaded onto threaded shanks formed on the inboard ends of shafts 92, 94.

Axle shafts 92, 94 are provided to mount wheels 14, 16. Each of shafts 92, 94 includes a radial flange 124 at an outboard end to which a corresponding wheel 14, 16 may be mounted in a conventional manner. Shafts 92, 94 are supported for rotation within portions 112, 114 of housings 74, 76 by one or more sets of conventional bearings disposed within housings 74, 76.

Brake 96 is provided to prevent rotation of driven shaft 82 and, as a result, motor shaft 118 and axle shafts 92, 94. Brake 96 is conventional in the art. Brake 96 may be received within rearward extension 106 of gear housing 76 and a housing 124 for brake 96 may be affixed to housing 76 using conventional fasteners as illustrated in FIG. 4. Brake 96 applies a braking force directly onto driven shaft 82.

A suspension and a drive assembly in accordance with the present invention are advantageous. In particular, the suspension and the drive assembly enable wheels that are disposed on longitudinally spaced axles and that are driven by the same power source to move independently from one another. Further, the inventive suspension and drive assembly achieves this goal while reducing part count, weight, and cost.

While the invention has been shown and described with reference to one or more particular embodiments thereof, it will be understood by those of skill in the art that various changes and modifications can be made without departing from the spirit and scope of the invention.

I claim:

1. A suspension for a vehicle, comprising:
   a bearing support disposed about an axis;
   a first arm mounted to said bearing support for rotation about said axis, said first arm extending forward from said bearing support and configured to support a first wheel proximate a forward end of said first arm; and,
   a second arm mounted to said bearing support for rotation about said axis independent of said first arm, said second arm extending rearward from said bearing support and configured to support a second wheel proximate a rearward end of said second arm.

2. The vehicle suspension of claim 1 wherein said bearing support includes:
   a mounting bracket coupled to a frame of said vehicle;
   first and second bearing members supported in said mounting bracket, said first and second bearing members aligned along said axis and spaced from one another along said axis.

3. The vehicle suspension of claim 2 wherein each of said first and second arms is mounted to both of said first and second bearing members.

4. The vehicle suspension of claim 2 wherein said mounting bracket defines an aperture into which said first and second bearing members extend and into which said first and second arms extend for connection to said first and second bearing members.

5. The vehicle suspension of claim 2, further comprising:
   a first damper mounted between said mounting bracket and said first arm; and,
   a second damper mounted between said mounting bracket and said second arm.

6. The vehicle suspension of claim 1, further comprising:
   a first damper mounted between said bearing support and said first arm; and,
   a second damper mounted between said bearing support and said second arm.

7. A drive assembly for driving first and second wheels disposed on first and second longitudinally spaced axles in a vehicle, comprising:
   a motor having an output shaft;
   a first pinion gear mounted on said output shaft;
   a first ring gear in mesh with said first pinion gear and drivingly coupled to said first wheel;
   a universal joint coupled to said output shaft;
   a driven shaft coupled to said universal joint;
   a second pinion gear mounted on said driven shaft; and,
   a second ring gear in mesh with said second pinion gear and drivingly coupled to said second wheel.

8. The drive assembly of claim 7 wherein said motor comprises a hydrostatic motor.

9. The drive assembly of claim 7 wherein said first pinion gear and said first ring gear are disposed within a first gear housing and a housing for said motor is coupled to said first gear housing.

10. The drive assembly of claim 7 wherein said universal joint includes a cardan shaft.

11. The drive assembly of claim 7, further comprising a brake configured to selectively apply a braking force directly on said driven shaft.

12. A suspension and drive assembly for first and second wheels disposed on first and second longitudinally spaced axles in a vehicle, comprising:
   a bearing support disposed about an axis;
   a first arm mounted to said bearing support for rotation about said axis, said first arm extending forward from said bearing support and configured to support a first wheel proximate a forward end of said first arm;
   a second arm mounted to said bearing support for rotation about said axis independent of said first arm, said second arm extending rearward from said bearing support and configured to support a second wheel proximate a rearward end of said second arm;
   a first gear housing coupled to said first arm and configured to receive a first driven axle shaft on which said first wheel is mounted;
   a second gear housing coupled to said second arm and configured to receive a second driven axle shaft on which said second wheel is mounted;
   a motor having a motor housing coupled to one of said first and second gear housings and configured to transmit torque to said first and second driven axle shafts.

13. The suspension and drive assembly of claim 12 wherein said bearing support includes:
   a mounting bracket coupled to a frame of said vehicle;
   first and second bearing members supported in said mounting bracket, said first and second bearing members aligned along said axis and spaced from one another along said axis.

14. The suspension and drive assembly of claim 13 wherein each of said first and second arms is mounted to both of said first and second bearing members.

15. The suspension and drive assembly of claim 13 wherein said mounting bracket defines an aperture into which said first and second bearing members extend and into which said first and second arms extend for connection to said first and second bearing members.

16. The suspension and drive assembly of claim 13, further comprising:
   a first damper mounted between said mounting bracket and said first arm; and,
   a second damper mounted between said mounting bracket and said second arm.

17. The suspension and drive assembly of claim 12, further comprising:
   a first damper mounted between said bearing support and said first arm; and,
   a second damper mounted between said bearing support and said second arm.

18. The suspension and drive assembly of claim 12 further comprising:
- a first pinion gear mounted on an output shaft of said motor and disposed within said first gear housing;
- a first ring gear in mesh with said first pinion gear and disposed within said first gear housing and drivingly coupled to said first driven axle shaft;
- a universal joint coupled to said output shaft of said motor;
- a driven shaft coupled to said universal joint;
- a second pinion gear mounted on said driven shaft and disposed within said second gear housing; and,
- a second ring gear in mesh with said second pinion gear and disposed within said second gear housing and drivingly coupled to said second driven axle shaft.

19. The suspension and drive assembly of claim 18 wherein said universal joint includes a cardan shaft.

20. The suspension and drive assembly of claim 18, further comprising a brake configured to selectively apply a braking force directly on said driven shaft.

21. The suspension and drive assembly of claim 12 wherein said motor comprises a hydrostatic motor.

* * * * *